(12) United States Patent
Kilchsperger et al.

(10) Patent No.: US 10,960,337 B2
(45) Date of Patent: Mar. 30, 2021

(54) SOOT PARTICLE FILTER AND METHOD FOR OPERATING A SOOT PARTICLE FILTER

(71) Applicant: Hug Engineering AG, Elsau (CH)

(72) Inventors: Roland Kilchsperger, Wallenwil (CH); Lukas Cavegn, Lustdorf (CH)

(73) Assignee: Hug Engineering AG, Elsau (CH)

(*) Notice: Subject to any disclaimer, the term of this patent is extended or adjusted under 35 U.S.C. 154(b) by 0 days.

(21) Appl. No.: 16/377,215

(22) Filed: Apr. 7, 2019

(65) Prior Publication Data
US 2019/0232207 A1 Aug. 1, 2019

Related U.S. Application Data

(63) Continuation of application No. PCT/EP2017/075977, filed on Oct. 11, 2017.

(30) Foreign Application Priority Data

Oct. 18, 2016 (DE) ...................... 10 2016 220 423.8

(51) Int. Cl.
*B01D 46/00* (2006.01)
*F01N 3/023* (2006.01)
(Continued)

(52) U.S. Cl.
CPC ......... *B01D 46/005* (2013.01); *B01D 46/006* (2013.01); *B01D 46/0063* (2013.01);
(Continued)

(58) Field of Classification Search
CPC combination set(s) only.
See application file for complete search history.

(56) References Cited

U.S. PATENT DOCUMENTS 4,573,317 A * 3/1986 Ludecke ............... F01N 3/0214
55/DIG. 30
4,641,496 A 2/1987 Wade
(Continued)

FOREIGN PATENT DOCUMENTS

AT       511 688 A1   1/2013
CN       1727649 A    2/2006
(Continued)

*Primary Examiner* — Binh Q Tran
(74) *Attorney, Agent, or Firm* — Aslan Law, P.C.

(57) ABSTRACT

In order to provide a flow device which is of simple construction and is operable reliably and in an energy-efficient manner, it is proposed that the flow device comprise the following: a plurality of flow segments which each comprise one or more flow bodies and through which a stream of raw gas is arranged to flow for removing impurities in a cleaning mode, wherein the stream of raw gas is arranged to be supplied to the flow segments via a raw gas supply system and wherein a stream of clean gas that has been cleaned by means of the flow segments is removable from the flow segments by means of a clean gas removal system; a regeneration device for regenerating the flow segments, wherein the regeneration device comprises a docking device for establishing a temporary connection between one or more flow segments that are to be regenerated on the one hand and a heating device and/or a flushing device of the regeneration device on the other hand.

20 Claims, 8 Drawing Sheets

(51) Int. Cl.
  *F01N 3/021* (2006.01)
  *F01N 3/027* (2006.01)
  *F01N 13/00* (2010.01)
  *F01N 13/08* (2010.01)
  *F01N 3/025* (2006.01)

(52) U.S. Cl.
  CPC ............. *F01N 3/025* (2013.01); *F01N 3/027* (2013.01); *F01N 3/0214* (2013.01); *F01N 3/0217* (2013.01); *F01N 3/0233* (2013.01); *F01N 13/017* (2014.06); *F01N 13/08* (2013.01); *B01D 2273/20* (2013.01); *F01N 2590/02* (2013.01)

(56) References Cited

U.S. PATENT DOCUMENTS

| | | | |
|---|---|---|---|
| 4,925,463 A | 5/1990 | Kuhnert | |
| 6,148,613 A * | 11/2000 | Klopp | F01N 3/20 137/625.43 |
| 6,233,926 B1 * | 5/2001 | Bailey | F01N 3/0222 137/625.31 |
| 6,887,290 B2 * | 5/2005 | Strauser | B01D 50/002 55/283 |
| 2004/0261374 A1 * | 12/2004 | Bailey | B01D 53/944 55/302 |
| 2005/0139075 A1 | 6/2005 | Iyer et al. | |
| 2006/0021333 A1 * | 2/2006 | Thaler | F01N 3/01 60/295 |
| 2010/0275585 A1 * | 11/2010 | Burkhardt | F01N 3/022 60/295 |
| 2015/0143994 A1 | 5/2015 | Archetti | |

FOREIGN PATENT DOCUMENTS

| | | |
|---|---|---|
| DE | 38 08 075 A1 | 9/1989 |
| EP | 0 188 075 A1 | 7/1986 |
| JP | 1993-500097 A | 1/1993 |
| KR | 10-2001-0026104 A | 4/2001 |
| WO | WO 87/07324 A1 | 12/1987 |
| WO | WO 91/19080 A1 | 12/1991 |
| WO | WO 97/03277 A1 | 1/1997 |
| WO | WO 2013/179266 A1 | 12/2013 |

* cited by examiner

SOOT PARTICLE FILTER AND METHOD FOR OPERATING A SOOT PARTICLE FILTER

RELATED APPLICATION

This application is a continuation of international application No. PCT/EP2017/075977 filed on Oct. 11, 2017, and claims the benefit of German application No. 10 2016 220 423.8 filed on Oct. 18, 2016, which are incorporated herein by reference in their entirety and for all purposes.

FIELD OF DISCLOSURE

The present invention relates to a flow device and to a method of operating a flow device. The flow device is, in particular, a separating device for use as an exhaust gas cleansing device in an exhaust gas system of an internal combustion engine. The internal combustion engine is, in particular, an internal combustion engine such as a marine engine for example which is operated with heavy fuel oil serving as the fuel, and/or any type of combustion engine which is operated with fuels loaded with solids and/or lubricants loaded with solids for example.

BACKGROUND

A flow device is known from WO 2013/179266 A1 for example.

SUMMARY OF THE INVENTION

The object of the present invention is to provide a flow device which is of simple construction and is operable in a reliable and energy-efficient manner.

In accordance with the invention, this object is achieved by a flow device for removing impurities from a stream of raw gas, in particular for separating soot particles from combustion exhaust gas, wherein the flow device comprises the following:

a plurality of flow segments which each comprise one or more flow bodies and through which the stream of raw gas is arranged to flow for removing impurities in a cleaning mode, wherein the stream of raw gas is arranged to be supplied to the flow segments via a raw gas supply system and wherein a stream of clean gas that has been cleaned by means of the flow segments is removable from the flow segments by means of a clean gas removal system;

a regeneration device for regenerating the flow segments, wherein the regeneration device comprises a docking device for establishing a temporary connection between one or more flow segments that are to be regenerated on the one hand and a heating device and/or a flushing device of the regeneration device on the other hand.

The flow device can preferably be constructed in a simple manner as well as be operated in a reliable and energy-efficient manner due to the fact that the flow device comprises a plurality of flow segments as well as a regeneration device with a docking device.

The flow device is preferably a separating device.
The flow segments are preferably separating segments.
The flow bodies are preferably separating bodies.
The cleaning mode is preferably a separating mode.
For the purposes of removing impurities, the impurities are preferably separated and/or converted.

In particular, the stream of raw gas is a stream of exhaust gas from an internal combustion device which is operated, in particular, with a heavy fuel oil such as Heavy Fuel Oil (HFO) or Marine Fuel Oil (MFO) etc. for example serving as the fuel. In particular, the internal combustion device is a static or mobile internal combustion device. For example, the internal combustion device is a marine engine.

It can be expedient if the flow device comprises a moving device for moving the docking device and/or the flow segments in such a way that the docking device is selectively dockable on different flow segments.

For example, the flow segments are settable into a rotary motion by means of the moving device.

In particular, the moving device comprises a drive device by means of which the flow segments and/or the docking device are movable automatically and/or in automated manner.

For example, provision may be made for the flow segments to be movable by means of the drive device of the moving device in discrete steps, wherein, for the purposes of regenerating it, another flow segment is preferably positioned relative to the docking device with each step. In particular, the flow segments are successively moveable in step-like manner into a regeneration position in which the docking device is dockable with the respective flow segment.

The drive device, in particular a motor such as an electric motor for example, is preferably arranged on a clean gas side of the flow segments facing the clean gas removal system.

It can be expedient if the drive device is arranged within a housing of the flow device so that, in particular, one can dispense with a passage through a housing wall for a shaft. Optimized sealing can thereby be achieved.

In one embodiment of the invention, provision may be made for each one of the flow segments to be constructed at least approximately in the form of a segment of a circular cylinder.

As an alternative or in addition thereto, provision may be made for the flow segments together to form an at least approximately circular cylindrical flow unit. For example, the flow segments together form a flow unit that is at least approximately in the form of a hollow circular cylinder.

A flow unit is preferably a separating unit.

Each flow segment preferably comprises a plurality of flow bodies which are accommodated in mutually differing and/or mutually spatially-separated flow body receptacles of the respective flow segment.

In particular, the flow bodies are fixed in the flow body receptacles.

It can be expedient if the flow bodies are at least approximately in the form of a circular cylinder. The flow body receptacles are preferably formed such as to be complementary thereto. In particular, the flow body receptacles are preferably in the form of hollow circular cylinders.

It can be advantageous if flange regions of the flow segments that are located outwardly taken with respect to a radial direction are formed by radially outwardly located ends of the flow body receptacles and/or of the flow bodies.

Flange regions of docking connector pieces formed complementarily thereto preferably enable simple contacting and/or sealing to be effected.

It can be expedient if each flow segment comprises a plurality of flow bodies which a) are arranged next to each other in a row and/or b) are aligned in parallel with each other and/or c) through which a stream of raw gas that is to be cleaned flows in parallel with each other and independently of one another.

Axes of symmetry and in particular rotational axes of the hollow circular cylindrical flow body receptacles and/or the circular cylindrical flow bodies of each flow segment are preferably aligned such as to be at least approximately parallel to one another.

Preferably, all the rotational axes of the flow body receptacles and/or of the flow bodies of all the flow segments intersect along a common axis. This axis is, in particular, a rotational axis of the flow unit.

A flow segment preferably comprises a plurality of flow bodies which are all arranged next to each other in a single row. For example, at least six flow bodies and in particular at least ten flow bodies are provided for each flow segment.

The flow unit preferably comprises or consists of at least six and in particular at least 8, at least 10 for example, such flow segments.

It can be expedient if the flow segments are arranged at least approximately in the form of a ring, wherein flow bodies and/or flow body receptacles for holding the flow bodies project outwardly from a base body of the respective flow segment in the radial direction taken with respect to a common central axis and/or a common axis of symmetry of the flow segments.

The central axis is, in particular, the rotational axis of the flow unit.

It can be advantageous if each flow segment comprises a respective base body and one or more flow bodies and/or flow body receptacles for holding the flow bodies which project, in particular, radially outwardly from the base body.

The base body preferably forms a raw gas distributor channel of each flow segment in the cleaning mode of the flow device.

In particular, the base body is arranged radially inwardly relative to the flow bodies and/or the flow body receptacles.

The base body preferably has a cross-sectional shape which corresponds to the shape of an annular section. In particular thereby, the cross section is taken perpendicularly to the rotational axis.

Furthermore, the base body of each one of the flow segments can, for example, form a clean gas collecting channel for concentrating and/or removing clean gas and/or an ash removal channel for the removal of ashes.

In the cleaning mode, the direction of flow through the base bodies is preferably in the radial direction from the interior to the exterior or from the exterior to the interior.

The base body of each one of the flow segments is preferably opened at one end in the axial direction.

Preferably, all the base bodies of all of the flow segments open up on a common side which, in particular, faces the raw gas supply system.

One or more flow body receptacles and in particular all of the flow body receptacles for holding one or more flow bodies preferably comprise a respective flange region onto which a flange region of the docking device corresponding thereto is placeable, in particular, is directly contactable therewith, is pressable thereon and/or is sealable thereto.

It can be expedient if the docking device comprises a plurality of docking connector pieces which, in particular, are movable relative to the flow segments and are pressable thereon.

The docking device preferably comprises a docking unit that is movable relative to the flow segments.

Preferably, the docking unit comprises a main channel as well as a plurality of docking connector pieces which project away from the main channel in the direction of the flow bodies of a flow segment of the main channel.

The docking unit is preferably movable by means of a lever mechanism, for example, movable in the direction of one or more flow segments and is pressable thereon.

The flow device preferably comprises a housing for accommodating the flow segments.

In particular, the docking unit is arranged within the interior of the housing and/or is movable therein.

Preferably, at least the docking connector pieces are arranged entirely within the interior of the housing and are movable therein.

The docking unit is preferably pressable substantially linearly in the radial direction onto the flow body receptacles of a flow segment or is removable therefrom in the opposite direction.

One or more flow segments that are to be regenerated are preferably fluidically separable by means of the docking unit from the raw gas supply system and the clean gas removal system and are integrable into a regeneration gas supply system of the regeneration device.

Provision may be made for the docking unit together with one or more flow segments that are to be regenerated to form a component part of a regeneration gas supply system of the regeneration device.

It can be expedient if the flow device comprises a rotor device by means of which the flow segments are supported and in particular mounted in rotatable manner relative to a housing of the flow device and/or relative to the docking device.

In particular, a plurality of flow segments and preferably all of the flow segments are movable together with one another, for example, in a rotatable manner.

Preferably, provision is made for the flow segments to be rotatable about a vertical axis.

The rotor device preferably comprises a segment receptacle for holding a plurality, in particular all, of the flow segments.

The segment receptacle is constructed, in particular, in the form of an annulus, a hollow cylinder and/or a hollow frustum of a cone.

Preferably, the flow segments project into the segment receptacle with radially inwardly tapering ends of the flow segments. Preferably thereby, the flow segments are securely fixed in the segment receptacle or on the segment receptacle.

The segment receptacle is preferably mounted on the housing in rotatable manner by means of a central shaft as well as by a rotary bearing.

The rotary bearing and the segment receptacle are preferably arranged on mutually opposite ends of the flow segments.

Preferably, the central shaft extends along an axis of symmetry or a rotational axis of the flow segments over the entire length of the flow segments.

It can be expedient if the flow segments are held and in particular mounted on the rotor device substantially independently.

The rotor device including the flow segments arranged thereon is preferably mounted on the housing of the flow device such as to be rotatable about an at least approximately vertical rotational axis.

It can be expedient if the flow segments are movable relative to each other for the purposes of compensating differing thermal expansions in one or more spatial directions.

In particular, one or more flow segments that are to be regenerated are arranged and in particular mounted during the regeneration thereof, in particular, during the implementation of the heating mode, relative to the rest of the flow segments in such a manner that a temperature-dependent expansion of the one or more flow segments that are to be regenerated has no effect or only a negligibly small effect on the other flow segments.

In particular, the flow segments are arranged in ring-like manner and are movable relative to each other in an axial and/or radial direction. A flow segment that has been heated up by the regeneration thereof can then expand outwardly, in particular, in the radial direction and in an axial direction, preferably upwardly against the direction of the force of gravity.

Provision may be made for the flow segments to be arranged such that they are thermally insulated from each other.

In particular, provision may be made for a thermal separating layer or one or more thermal separating elements to be arranged between two neighbouring flow segments.

It can be expedient if one or more spacers and in particular a ribbed structure are provided between respective neighbouring flow segments, in particular, for the avoidance of a large-area heat transference region between two neighbouring flow segments.

It can be advantageous if the regeneration device comprises a regeneration gas supply system by means of which the stream of hot gas is suppliable to one or more flow segments that are to be regenerated.

Preferably the stream of hot gas is arranged to be supplied to one or more flow segments that are to be regenerated from different directions by means of the regeneration gas supply system.

In particular, provision may be made for the stream of hot gas to be suppliable selectively to one or more flow segments that are to be regenerated from mutually differing directions by means of the regeneration gas supply system.

Provision may be made for the regeneration device to be settable into a heating mode in which the stream of hot gas coming from a heating device, in particular, a burner device and/or an electrical heating device is arranged to be supplied to one or to a plurality of flow segments that are to be regenerated in such a manner that a direction of flow in the one or the plurality of flow segments that are to be regenerated corresponds to a direction of flow in a cleaning mode in which a stream of raw gas that is to be cleaned flows through the one or the plurality of flow segments for the cleaning thereof.

It can be expedient if the regeneration device is settable into a flushing mode in which the stream of hot gas coming from a heating device, in particular a burner device and/or an electrical heating device, and/or a flushing gas is arranged to be supplied to one or to a plurality of flow segments that are to be regenerated in such a manner that a direction of flow in the one or the plurality of flow segments that are to be regenerated is opposite to a direction of flow in a cleaning mode in which a stream of raw gas that is to be cleaned flows through the one or the plurality of flow segments for the cleaning thereof.

The regeneration device preferably comprises a fan for propelling the stream of hot gas.

Furthermore, provision may be made for the regeneration device to comprise a flushing device, in particular, for the purposes of supplying a flushing gas such as fresh air for example to the regeneration gas supply system.

It can be advantageous if the fan is arranged downstream of the heating device and/or downstream of the one or the plurality of flow segments that are to be regenerated taken with respect to a direction of flow of the stream of hot gas in a heating mode of the regeneration device and/or taken with respect to a direction of flow of the stream of hot gas in a flushing mode of the regeneration device.

The direction of flow of the stream of hot gas in the heating mode on the one hand and the direction of flow of the stream of hot gas in the flushing mode are preferably opposite to one another in the region of the one or the plurality of flow segments that are to be regenerated.

Nevertheless, the regeneration gas supply system is preferably formed in such a manner that, in both the heating mode and in the flushing mode, the fan is arranged downstream of the heating device and/or downstream of the one or the plurality of flow segments that are to be regenerated.

In an alternative embodiment of the invention, provision may be made for the fan to be arranged upstream of the heating device taken with respect to the direction of flow of the stream of hot gas and/or taken with respect to an air supply stream that is to be supplied to the heating device.

It can be advantageous if the regeneration device comprises a retaining device for separating and accommodating impurities that have been removed from the one or the plurality of flow segments that are to be regenerated.

In particular, these impurities are ashes which are produced in the one or the plurality of flow segments that are to be regenerated during the implementation of the heating mode and which initially remain therein and which are preferably carried away from the one or the plurality of flow segments that are to be regenerated in the flushing mode.

The retaining device preferably comprises a solids separator and in particular a cyclone for separating the impurities and in particular the ashes from the gas flow and in particular the stream of hot gas by means of which the impurities, in particular the ashes, are carried away from the one or the plurality of flow segments that are to be regenerated.

Furthermore, the retaining device preferably comprises a storage container for storing the impurities, in particular, the ashes.

It can be expedient if the retaining device comprises a bucket wheel which separates the solids separator from the storage container and in particular serves for the controlled removal and onward conveyance to the storage container of the impurities that were separated out in the solids separator.

Provision may be made for the retaining device to be fluidically connected by means of the regeneration gas supply system to the one or the plurality of flow segments that are to be regenerated and/or to a fan of the regeneration device.

The retaining device is preferably arranged between the one or the plurality of flow segments that are to be regenerated on the one hand and the fan of the regeneration device on the other hand taken with respect to a direction of flow of the stream of hot gas and/or a stream of flushing gas.

In one embodiment of the invention, provision may be made for the stream of hot gas to be suppliable to the raw gas supply system and/or the clean gas removal system of the flow device after flowing through the one or the plurality of flow segments that are to be regenerated, after flowing through the retaining device and/or after flowing through the fan.

The regeneration gas supply system preferably comprises a plurality of lines, valves, branches and/or junctions which are arranged and/or formed in particular in such a manner that the previously described connections and flows are possible.

In particular, a flow body is a filter body such as a so-called wall flow filter for example.

It can be expedient if a flow body is a honeycomb body having permeable walls.

A flow body preferably comprises a catalytic coating so that impurities that are disposed in or have been separated and/or converted in the flow body can be chemically converted at a reduced combustion temperature compared with a normal combustion process.

In particular, a flow body is made of a ceramic material and/or is provided with a catalytic coating.

Furthermore the present invention relates to a method of operating a flow device.

In this respect, the object of the invention is to provide a method which is implementable in a simple, reliable and energy-efficient manner.

In accordance with the invention, this object is achieved by a method of operating a flow device, in particular for separating soot particles from combustion exhaust gas, wherein the method comprises the following:

passing a stream of raw gas that is to be cleaned through a plurality of flow segments of the flow device whereby impurities from the stream of raw gas are separated and/or converted in flow bodies of the flow segments and a stream of clean gas is obtained downstream of the flow segments;

regenerating one or more flow segments by means of a regeneration device, wherein a temporary connection between one or more flow segments that are to be regenerated on the one hand and a heating device and/or a flushing device of the regeneration device on the other hand is established by means of a docking device of the regeneration device.

The method in accordance with the invention preferably has individual or several features and/or advantages described in connection with the flow device in accordance with the invention.

It can be expedient if the one or the plurality of flow segments that are to be regenerated are decoupled functionally and/or fluidically from the remainder of the flow segments by means of the docking device and regenerated by means of the regeneration device whilst the other flow segments continue to be used in a cleaning mode for removing impurities from the stream of raw gas.

The flow segments are preferably regenerable separately and successively by means of the regeneration device.

A housing of the flow device is preferably hermetically sealed with respect to the environment thereof. In particular, all the movable components and/or lines and/or supply systems are preferably fixed to a housing wall of the housing in resilient and flexible manner by means of one or a plurality of metallic bellows. In particular, thermal changes of expansion can thereby be reliably compensated without impairing the tightness of the housing.

The moving device for moving the flow segments, in particular the rotor device, can comprise a ratchet drive for example. The rotor device including the flow segments arranged thereon is then preferably operable by means of a linear movement from outside the filter housing.

Further preferred features and/or advantages of the invention form the subject matter of the following description and the graphical illustration of an exemplary embodiment.

Figure 1:
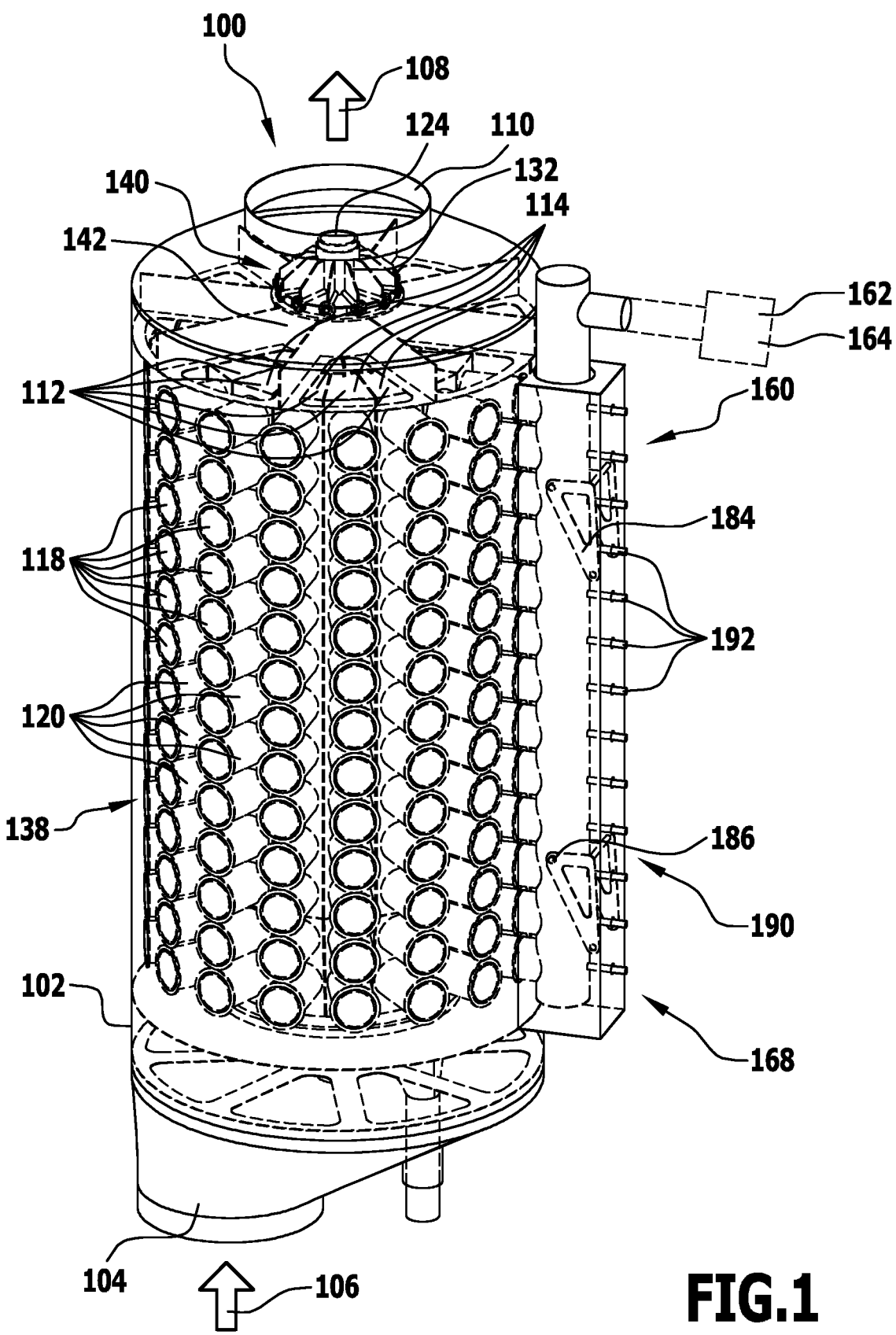
FIG. 1 shows a schematic perspective illustration of an embodiment of a flow device wherein a housing of the flow device is illustrated transparently for the purposes of illustrating the components contained therein.

Similar or functionally equivalent elements are provided with the same respective symbols in each of the Figures.

DETAILED DESCRIPTION OF THE DRAWINGS

An embodiment of a flow device that is designated as a whole by 100 and is illustrated in FIGS. 1 to 9 is used as a component part of an exhaust-gas cleaning system of an internal combustion engine for example.

Hereby, the flow device 100 is suitable in particular for use in or in combination with a diesel engine such as a heavy oil diesel engine for example.

The flow device 100 can be made use of in particular in static applications or in mobile applications.

In particular, one application for the use of the flow device 100 can be in the exhaust gas system of a marine engine which is operated with heavy oil. Furthermore, the flow device 100 is preferably suitable for other types of internal combustion engines which are operated with fuels loaded with solids and/or lubricants loaded with solids for example.

The flow device 100 comprises a housing 102 to which a stream of raw gas 106 is arranged to be supplied via a raw gas supply system 104.

In particular, the stream of raw gas 106 is cleanable within the housing 102 whereby a stream of clean gas 108 is obtainable.

In particular, the stream of clean gas 108 is removable from the housing 102 via a clean gas removal system 110.

For the purposes of cleaning the stream of raw gas 106, the flow device 100 comprises a plurality of flow segments 112, for example, 10, 12, 14 or 16 flow segments 112.

The flow segments 112 are, in particular, arranged substantially in the form of a circular cylinder and/or in the form of an annulus.

Each flow segment 112 preferably comprises a base body 114.

The cross sections of the base bodies 114 of the flow segments 112 are each, in particular, in the form of a section of an annulus which, when brought together, form a completely closed annulus.

Hereby in particular, the base bodies 114 of the flow segments 112 are arranged symmetrically about an axis of symmetry 116.

Each flow segment 112 preferably comprises a plurality of flow bodies 118 which are arranged in flow body receptacles 120.

The flow body receptacles 120 are fixed to the base bodies 114 of each one of the flow segments 112 and project, in particular, away from the respective base body 114.

In particular, the flow body receptacles 120 are preferably arranged on the base bodies 114 in such a manner that they project outwardly from the base bodies 114 in a radial direction 122 taken with respect to the axis of symmetry 116.

The flow body receptacles 120 are constructed, in particular, in the form of substantially hollow circular cylinders.

The flow bodies 118 preferably substantially completely fill out the flow body receptacles 120 and, in particular, are formed such as to be substantially complementary to the interiors of the flow body receptacles 120.

The flow bodies 118 are thus constructed, in particular, in the form of a circular cylinder.

Figure 4:
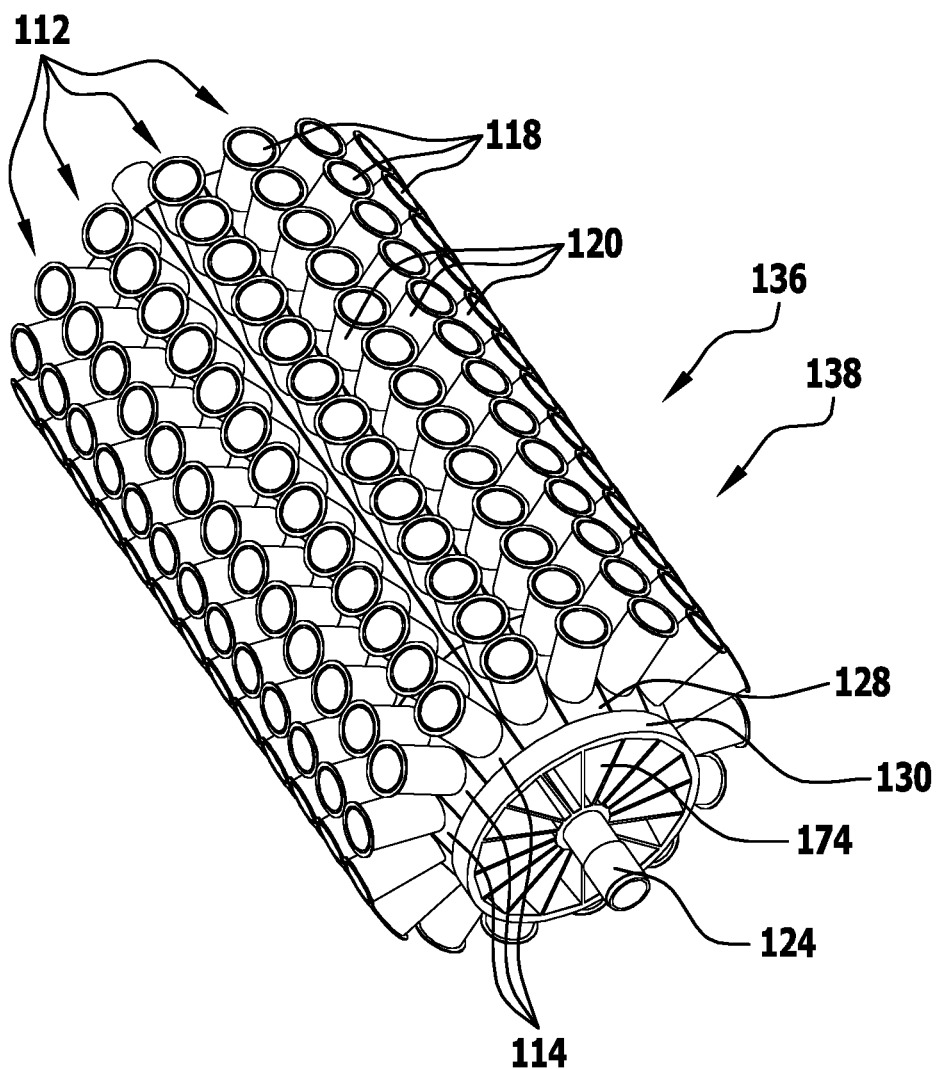
FIG. 4 a schematic illustration of a rotor device of the flow device including flow segments of the flow device that are arranged on the rotor device.

As can be derived in particular from FIG. 4, the flow segments 112 are arranged symmetrically around a central shaft 124 and are fixed relative thereto.

In particular, the base bodies 114 of the flow segments 112 are provided with an end 128 which tapers in an axial direction 126, wherein the respective tapering end 128 of each one of the base bodies 114 projects into a segment receptacle 130 and is held in a desired position thereby.

In particular, the segment receptacle 130 is arranged on the central shaft 124 and is fixed thereto in mutually non-rotatable manner for example.

Figure 2:
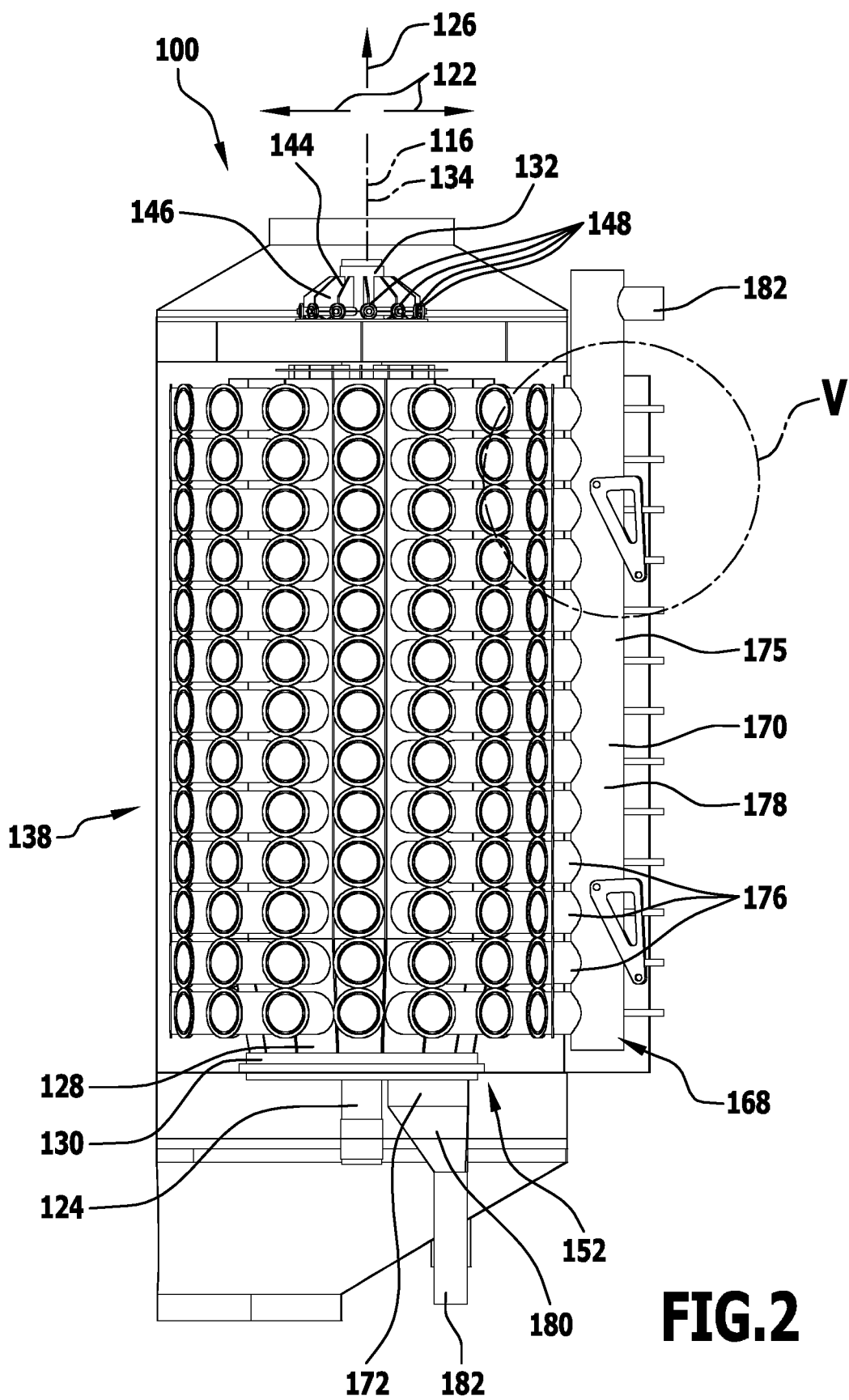
FIG. 2 a schematic side view of the flow device depicted in FIG. 1.

As can be derived from FIG. 2 in particular, a rotary bearing 132 is provided at an end of the central shaft 124 opposite the segment receptacle 130.

The central shaft 124, the segment receptacle 130 and the flow segments 112 are preferably mounted on the housing 102 such as to be rotatable about the axis of symmetry 116 by means of this rotary bearing 132.

Thus in particular, the axis of symmetry 116 is also a rotational axis 134.

In particular, the component parts of the flow device 100 that are mounted on the housing 102 in rotatable manner are referred to as a whole as a rotor device 136.

The whole entity of the flow segments 112 is, in particular, a flow unit 138.

Furthermore, the flow device 100 preferably comprises a moving device 140 for moving and in particular rotating the rotor device 136 within the housing 102.

For this purpose in particular, the moving device 140 may comprise a (not illustrated) drive device.

In particular, the rotor device 136 is rotatable in step-like manner about the rotational axis 134 by means of the moving device 140.

The flow segments 112 are thereby successively positionable in particular in step-like manner relative to a regeneration device in a manner that is yet to be described.

Figure 3:
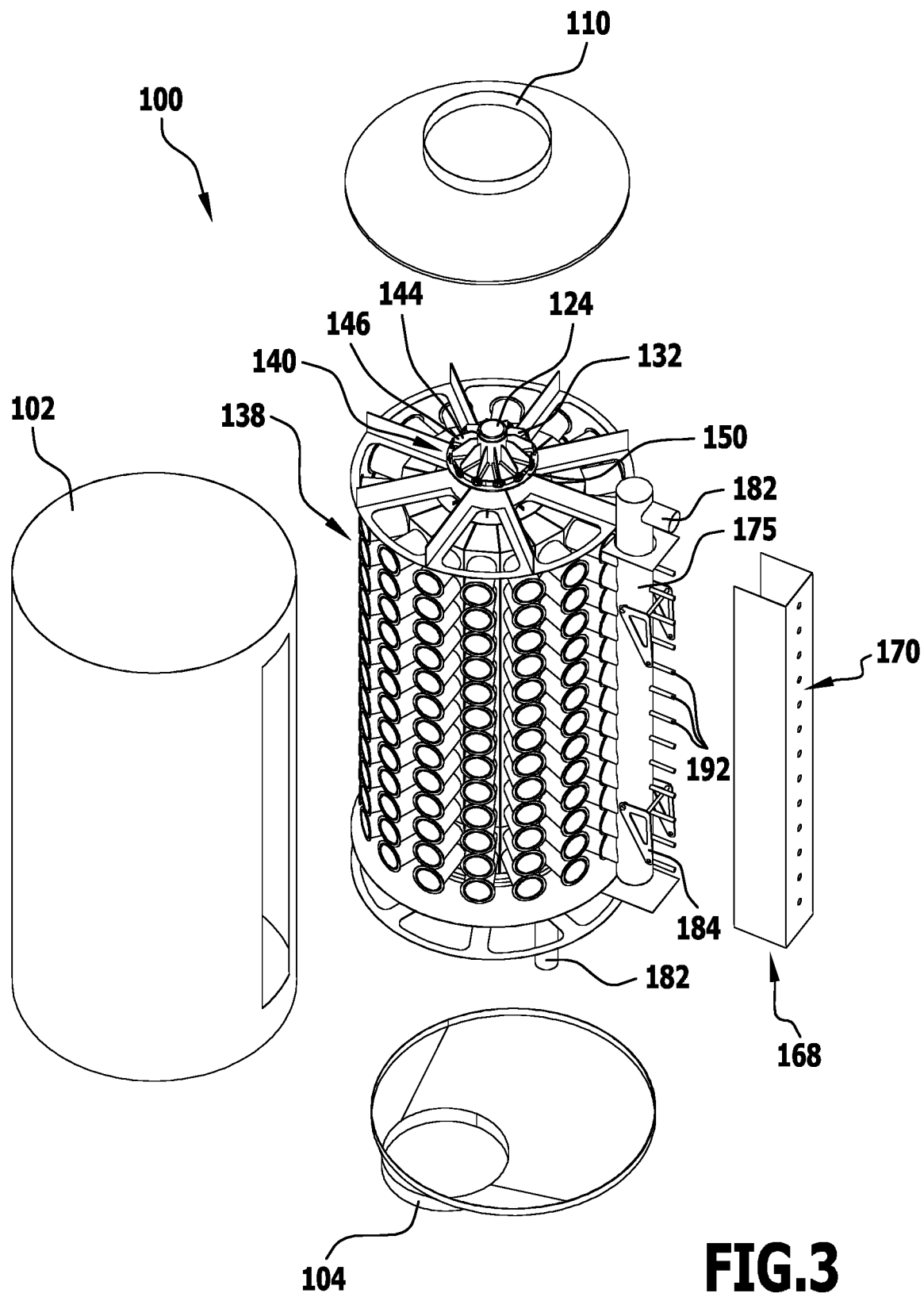
FIG. 3 a schematic exploded illustration of the flow device depicted in FIG. 1.

As can further be derived from FIGS. 1 to 3, the flow device 100 comprises an upper bearing ring 142 on which the rotary bearing 132 is mounted in rotatable manner.

In particular, the rotary bearing 132 comprises a bearing star 144 which consists of a plurality of projections 146 that project outwardly in the radial direction 122. On the projections 146, there are arranged bearing rollers 148 which can roll in a circle along a circular rolling path 150 on the upper bearing ring 142.

Furthermore, the flow device 100 comprises a lower bearing ring 152 which preferably merely serves for laterally stabilizing and/or guiding the rotor device 136.

The lower bearing ring 152 preferably does not take up any weight forces of the rotor device 136.

Figure 7:
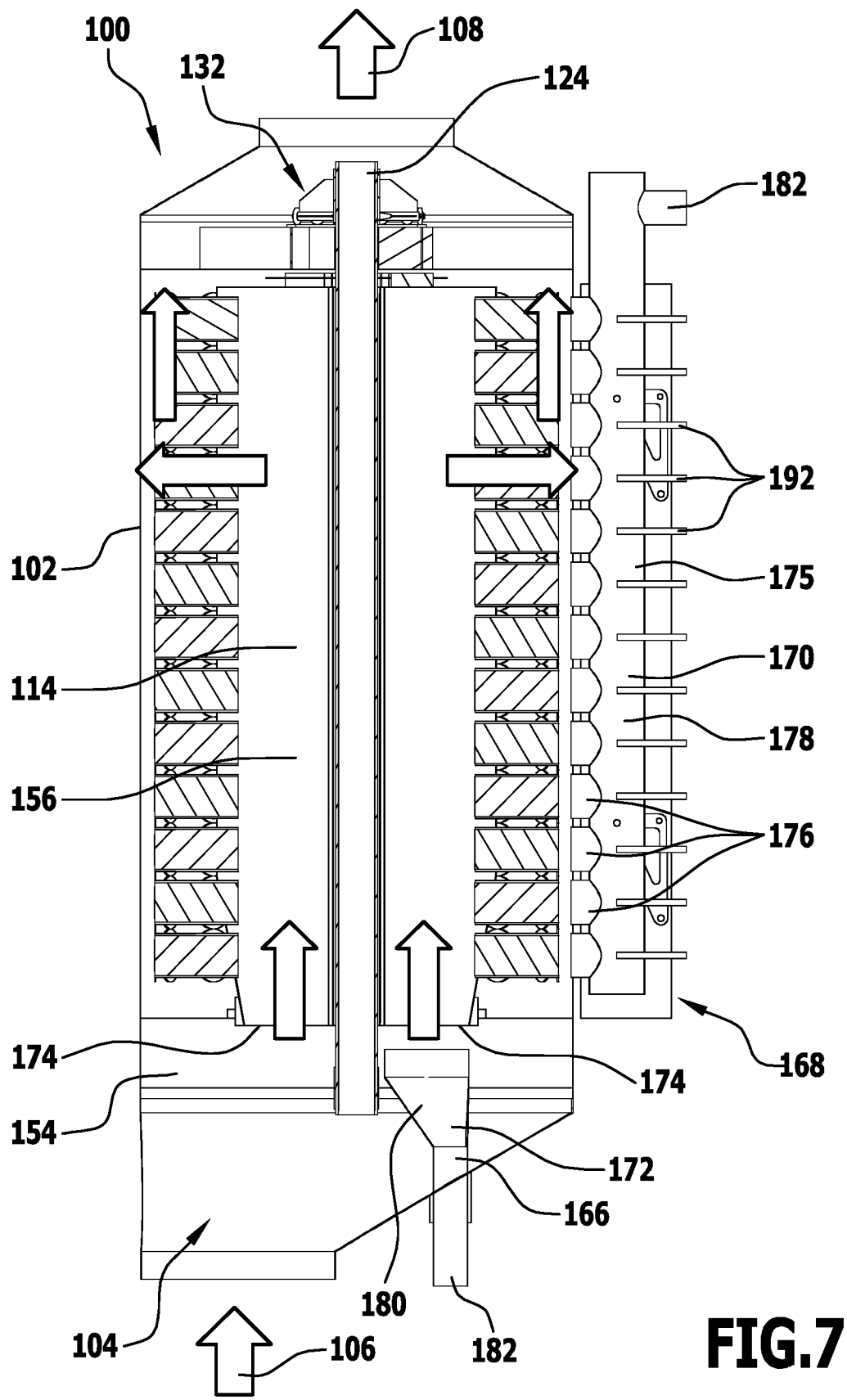
FIG. 7 a schematic section through the flow device depicted in FIG. 1 for the purposes of illustrating the functioning of the flow device wherein the flow device is being operated in a cleaning mode.

The flow device 100 is operable in the cleaning mode illustrated in particular in FIG. 7.

The stream of raw gas 106 is introduced into an interior 154 of the housing 102 in this cleaning mode.

The stream of raw gas 106 is thereby introduced by means of the raw gas supply system 104 into the base bodies 114 of the flow segments 112 which, for this purpose, are formed such as to be open at the lower end thereof taken with respect to the direction of the force of gravity.

The stream of raw gas 106 is distributed over the flow bodies 118 in the flow body receptacles 120 by means of the base bodies 114.

The base bodies 114 thus form, in particular, raw gas distributor channels 156.

The stream of raw gas 106 flows through the flow bodies 118 in the radial direction 122 from the interior to the exterior.

Impurities contained in the stream of raw gas 106, in particular soot particles, are thereby separated and/or converted in the flow bodies 118.

In consequence, a stream of gas flowing out of the flow bodies 118 is a cleansed gas stream, in particular, the stream of clean gas 108.

The stream of clean gas 108 is guided along the exterior of the flow segments 112 taken in particular with respect to the radial direction 122 and/or between the flow segments 112 and is exhausted from the housing 102 via the clean gas removal system 110.

After a long period of operation of the flow device 100, then, due to the continuous removal of impurities, there will be a resultant ever-increasing loading of the flow bodies 118 with impurities, in particular soot.

Consequently, the flow bodies 118 must be regularly regenerated in order to enable the flow device 100 to operate continuously and reliably.

The flow device 100 comprises a regeneration device 160 for this regenerating process.

The regeneration device 160 comprises in particular a heating device 162 and/or a flushing device 164.

Furthermore, the regeneration device 160 comprises a regeneration gas guidance system 166.

The regeneration device 160 preferably comprises a docking device 168 which can be docked on to a flow segment 112 for the regeneration thereof.

The flow segment 112 that is to be regenerated is thereby fluidically separated from the interior space 154, the raw gas supply system 104 and/or the clean gas removal system 110 and is then a part and in particular a section of the regeneration gas guidance system 166.

To this end, the docking device 168 comprises a docking unit 170 which, in particular, is arranged to be placed on and preferably pressed against the flow body receptacles 120 of the flow segment 112 that is to be regenerated.

Furthermore, the docking device 168 preferably comprises a further docking unit 172 which is preferably dockable on to an open end 174 of a base body 114 of a flow segment 112.

In particular, the open end 174 is the tapering end 128.

The docking unit 170 that is dockable on to the flow body receptacles 120 preferably comprises a main channel 175 which extends in parallel with the axial direction 126 and comprises a plurality of docking connector pieces 176 which succeed one another along the axial direction 126.

In particular, the docking connector pieces 176 project inwardly away from the main channel 175 in the radial direction 122.

In particular, the docking connector pieces 176 are formed such as to be complementary to the flow body receptacles 120 at least in sections thereof in order to thereby ensure reliable contact and/or sealing between the flow segment 112 that is to be regenerated and the docking unit 170.

The main channel 175 could, for example, also be referred to as an outlet pipe 178.

The docking unit 172 that is dockable on to the open end 174 of the base body 114 of the flow segment 112 that is to be regenerated preferably comprises a collecting funnel 180.

Both the collecting funnel 180 and the main channel 175 are in each case connectable by means of a connecting piece 182 to the (not illustrated) remaining part of the regeneration gas guidance system 166.

The docking elements 170, 172 are arranged, in particular, to be linearly displaceable in order to facilitate the docking process.

In particular hereby, the docking unit 170 is movable inwardly or outwardly in the radial direction 122. To this end in particular, one or more pivotal elements 184 are provided on the housing 102 of the flow device 100 for the pivotal and/or linearly moveable mounting of the main channel 175.

The further docking unit 172 is mounted on the housing 102, in particular, such as to be linearly displaceable parallel to the axial direction 126 in order to enable the docking unit 172 to be pressed selectively on to the open end 174 of the base body 114 of the flow segment 112 that is to be regenerated or enable it to be removed therefrom.

Preferably in particular a temperature-dependant expansion of the movable or other components of the flow device 100 and in particular of the docking units 170, 172 can be compensated by means of one or more sliding bearings 186.

The docking units 170, 172 and/or the flow segments 112, in particular the flow body receptacles 120, the docking connector pieces 176 etc. preferably each comprise a flange region 188 for the reliable contact and sealing thereof.

Figure 5:
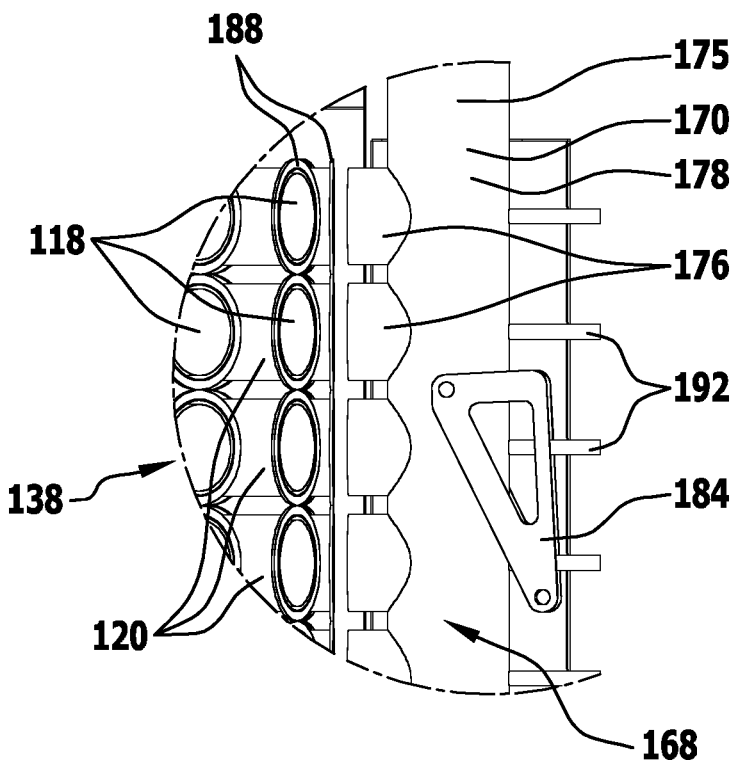
FIG. 5 an enlarged illustration of the region V in FIG. 2 wherein a docking device is spaced from a flow segment that is to be regenerated.
Figure 6:
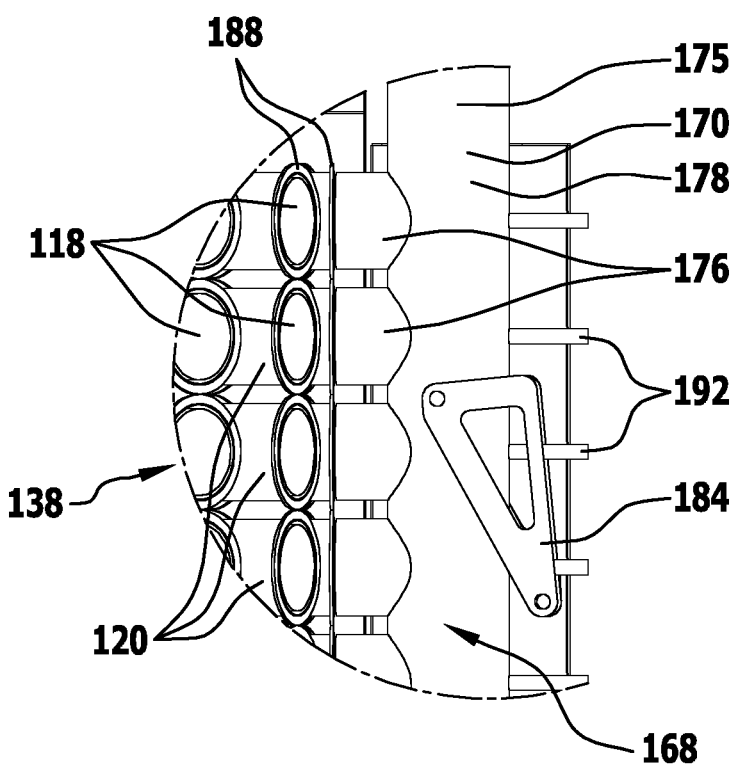
FIG. 6 a schematic illustration corresponding to FIG. 5 of the region V in FIG. 2 wherein the docking device is docked on a flow segment that is to be regenerated.

As can be derived from FIGS. 5 and 6 in particular, the flange regions 188 can, for example, be brought into matching contact with one another by the movement of the docking unit 170 in order to optimize a sealing effect.

In operation of the flow device 100, the flow segments 112 are preferably continuously regenerated separately and successively.

The flow device 100 can thereby continue to be used for the process of cleaning the stream of raw gas 106 despite the currently occurring regeneration of a flow segment 112.

In particular, only one flow segment 112 is preferably regenerated in each case, whilst all of the other flow segments 112 are used for the removal of impurities from the stream of raw gas 106.

The regeneration process preferably proceeds as follows:

Firstly, a flow segment 112 that is to be regenerated is brought into a regeneration position by rotating the entire flow unit 138 and/or the rotor device 136 in which the flow segment 112 that is to be regenerated is arranged directly in front of the docking unit 170 of the docking device 168 in the radial direction 122.

The docking units 170, 172 are then moved towards the flow segment 112. The flow body receptacles 120 of the flow segment 112 that is to be regenerated are thereby covered by the docking connector pieces 176. The open end 174 of the base body 114 of the flow segment 112 that is to be regenerated is thereby covered by the docking unit 172.

The passage of the stream of raw gas 106 through the flow segment 112 that is to be regenerated is thereby interrupted.

Rathermore, the flow segment 112 that is to be regenerated can now be subjected to a gas from the regeneration gas guidance system 166.

Figure 8:
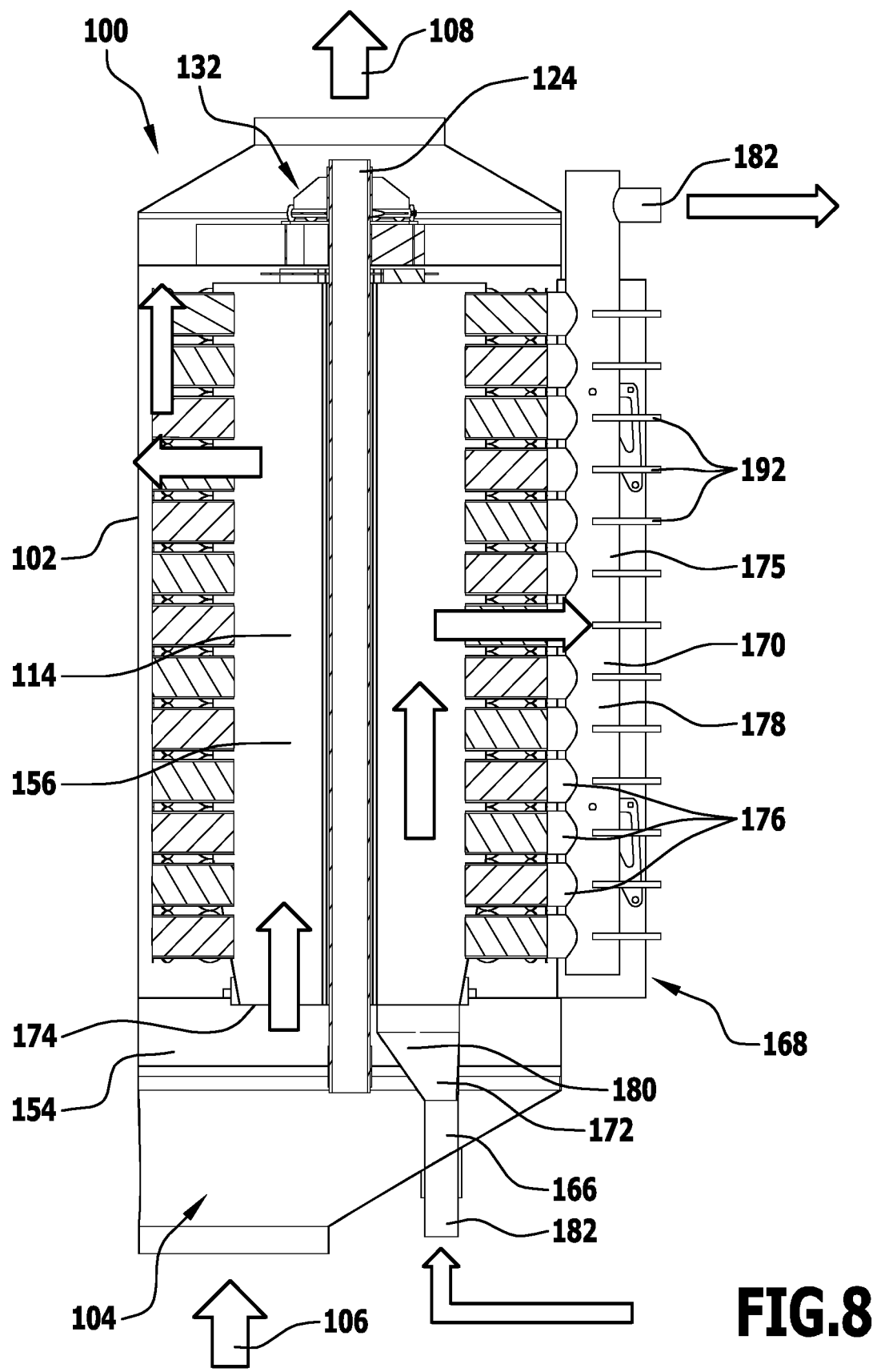
FIG. 8 a sectional view corresponding to FIG. 7 of the flow device depicted in FIG. 1 wherein the flow device is being operated in a heating mode.

In accordance with the illustration of a heating mode illustrated in FIG. 8, a stream of hot gas is produced by means of the regeneration device 160, in particular, by means of the heating device 162, and is passed through the flow segment 112 that is to be regenerated.

The stream of hot gas thereby enters the base body 114 of the flow segment 112 through the open end 174 and is distributed over the flow body receptacles 120 and the flow bodies 118 arranged therein.

The stream of hot gas flows through the flow bodies 118 and thereby heats them.

In particular thereby, impurities contained in the flow bodies 118 will be heated up to such an extent that they will be chemically converted and in particular will be burnt.

The flow bodies 118 are preferably provided with a catalytic coating in order to facilitate chemical conversion of the impurities.

The heating mode is maintained until at least a major portion of the impurities contained in the flow bodies 118 have been burnt.

A residual amount of the impurities then remains in the flow bodies 118, in particular, ashes which cannot be eliminated even by means of a further heating process.

These ashes are therefore removed from the flow bodies 118 in a different manner.

Figure 9:
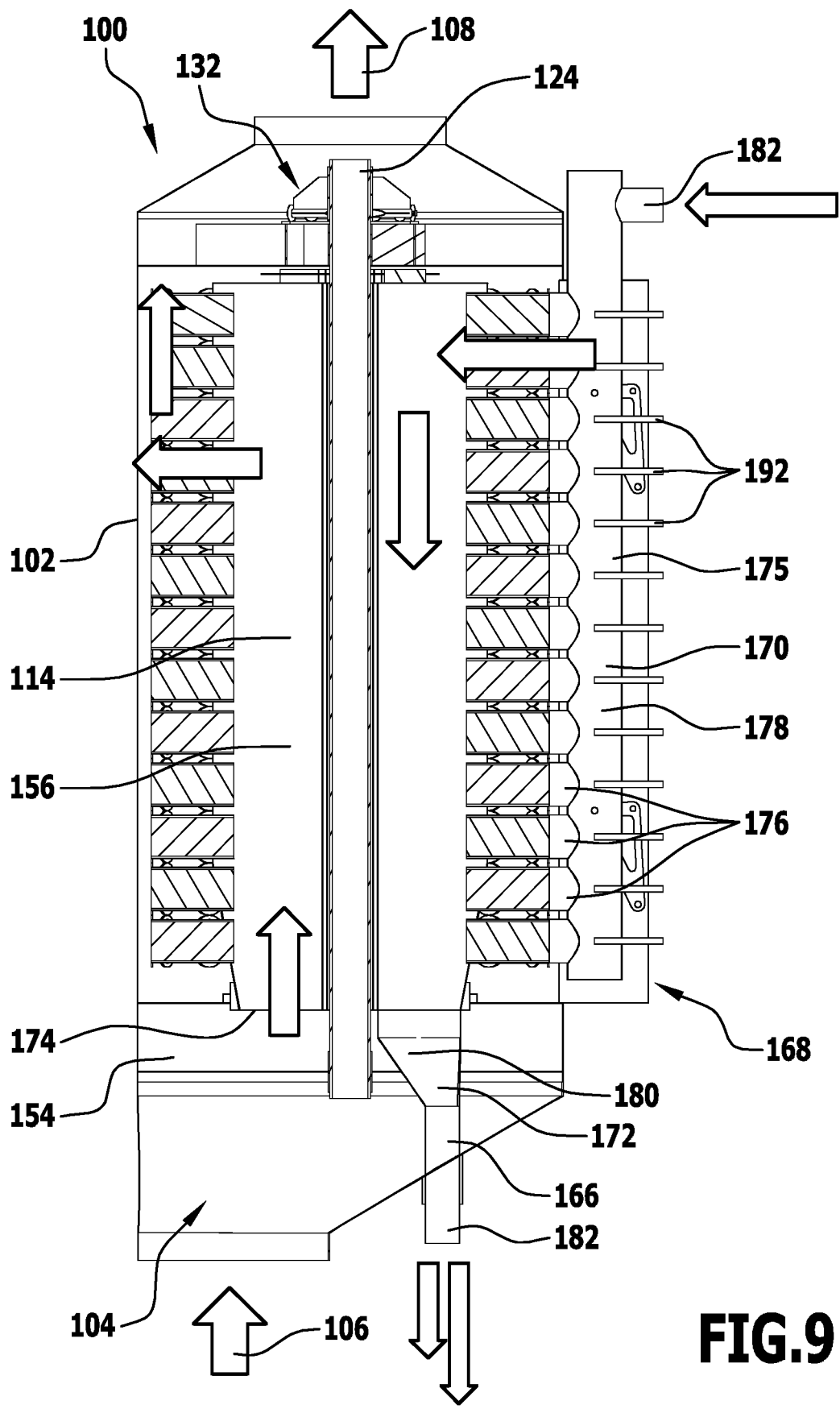
FIG. 9 a sectional view corresponding to FIG. 7 of the flow device depicted in FIG. 1 wherein the flow device is being operated in a flushing mode.

In particular thereby, a flushing mode is activated as is illustrated in FIG. 9.

In this flushing mode, the direction of flow of a stream of gas that is flowing through the flow bodies 118 is reversed.

On the one hand thereby, the stream of gas can be the stream of hot gas.

As an alternative or in addition thereto, a stream of flushing gas that is made available in particular by a flushing device 164 can be used.

Due to the reversed direction of flow, the impurities are discharged from the flow bodies 118 and in particular are then transported into the base body 114 of the flow segment 112 that is to be regenerated. Finally, the impurities are removed from the base body 114 and thus from the entire flow segment 112 via the docking unit 172, in particular, via the collecting funnel 180.

The axis of symmetry 116 and thus too the rotational axis 134 are preferably oriented such as to be substantially vertical.

The open end 174 of the base body 114 of the flow segment 112 that is to be regenerated is preferably arranged at a lower end of the flow segment 112 taken with respect to the direction of the force of gravity.

A simplified process of removing the flushed-out impurities can thereby be obtained since they can fall downwardly and then be removed via the collecting funnel 118 due to the force of gravity.

An additional loosening device 190 can be provided, in particular, for the purposes of cleaning-off caked-on impurities from the flow bodies 118.

The loosening device 190 comprises a pressure pulse device for example which in particular comprises a plurality of pulse tubes 192.

In particular, the pulse tubes 192 are a component part of the docking unit 170 and preferably project into the main channel 175 and/or the docking connector pieces 176.

In particular, the pulse tubes 192 are preferably directed towards the flow bodies 118 when the docking device 168 is docked onto a flow segment 112 that is to be regenerated.

In particular, a pressure pulse can be applied to the flow bodies 118 by means of the pulse tubes 192 in order to loosen the impurities contained therein and then to remove them from the flow bodies 118.

As an alternative or in addition to such a pressure pulse cleaning process for example, provision can be made for cleaning to be effected by means of sound waves and in particular by means of a resonator device. Such a resonator device is, in particular, integrated into the main channel 175 in order to produce a standing sound wave therein for example, whereby loosening of the impurities in the flow bodies 118 can likewise be achieved.

After regeneration of a flow segment 112 has occurred, the docking device 168 is removed from this flow segment 112.

Thereafter, the flow unit 138 and/or the rotor device 136 are rotated further by means of the moving device 140 in order to bring another flow segment 112 into the regeneration position and enable it to be regenerated by means of the regeneration device 160.

Ultimately, all of the flow segments 112 can be successively regenerated in turn in this way.

In dependence on the selected total number of flow segments 112, only a small fraction of the flow bodies 118 is preferably ever regenerated at a certain moment in time so that a majority of the flow bodies 118 are always continuously available for the process of cleaning the stream of raw gas 106.

In particular in the case where the flow device 100 is made use of in large marine engines, a space-saving arrangement as well as simple construction and reliable operation are made possible despite a relatively large volume of separated material by virtue of the selected configuration of the flow device 100.

The invention claimed is:

1. A flow device for the removal of impurities from a stream of raw gas, wherein the flow device comprises the following: a plurality of flow segments which each comprise multiple flow bodies and through which the stream of raw gas can flow for removing impurities in a cleaning mode, wherein the stream of raw gas can be supplied to the flow segments via a raw gas supply system and wherein a stream of clean gas that has been cleaned by the flow segments is removable from the flow segments by a clean gas removal system;
   a regeneration device for regenerating the flow segments, wherein the regeneration device comprises a docking device for establishing a temporary connection between one or more flow segments that are to be regenerated on the one hand and at least one of a heating device and a flushing device of the regeneration device on the other hand, wherein a direction of flow through the flow bodies in the cleaning mode is in a radial direction from an interior to an exterior.

2. The flow device in accordance with claim 1, wherein the flow device is a separating device, in that the flow segments are separating segments and in that the flow bodies are separating bodies.

3. The flow device in accordance with claim 1, wherein the flow device comprises a moving device for moving the docking device or the flow segments in such a manner that the docking device is selectively dockable on different flow segments, wherein further provision is preferably made for the flow segments to be settable into a rotary motion by the moving device.

4. The flow device in accordance with claim 1, wherein each one of the flow segments is constructed at least approximately in the form of a segment of a circular cylinder and/or in that the flow segments together form an at least approximately circular cylindrical flow unit.

5. The flow device in accordance with claim 1, wherein each flow segment comprises a plurality of flow bodies which are accommodated in mutually differing and/or mutually spatially-separated flow body receptacles of the respective flow segment.

6. The flow device in accordance with claim 1, wherein each flow segment comprises a plurality of flow bodies which
   a) are arranged next to each other in a row and/or
   b) are aligned such as to be parallel to one another and/or
   c) through which a stream of raw gas that is to be cleaned can flow in parallel with each other and independently of one another.

7. The flow device in accordance with claim 1, wherein the flow segments are arranged at least approximately in the form of a ring, wherein the flow bodies and/or flow body receptacles for holding the flow bodies project outwardly from a base body of the respective flow segment in the radial direction taken with respect to a common central axis and/or a common axis of symmetry of the flow segments.

8. The flow device in accordance with claim 1, wherein each flow segment comprises a respective base body and multiple flow bodies and flow body receptacles for accommodating the flow bodies which project away from the base body and project radially outwardly.

9. The flow device in accordance with claim 8, wherein the base body forms a raw gas distributer channel of each flow segment in the cleaning mode of the flow device.

10. The flow device in accordance with claim 1, wherein multiple flow body receptacles for accommodating multiple flow bodies of each one of the flow segments comprise a flange region against which a flange region of the docking device corresponding thereto is placeable.

11. The flow device in accordance with claim 1, wherein the docking device comprises a plurality of docking connector pieces which are movable relative to the flow segments and are pressable thereon.

12. The flow device in accordance with claim 1, wherein the docking device comprises a docking unit that is movable relative to the flow segments and comprises a main channel as well as a plurality of docking connector pieces which project away from the main channel in the direction of the flow bodies of the flow segments of the main channel.

13. The flow device in accordance with claim 1, wherein one or more flow segments that are to be regenerated are fluidically separable by the docking unit from the raw gas supply system and the clean gas removal system and are integrable into a regeneration gas guidance system of the regeneration device.

14. The flow device in accordance with claim 1, wherein the flow device comprises a rotor device by which the flow segments are accommodated such as to be rotatable relative to a housing of the flow device or relative to the docking device.

15. The flow device in accordance with claim 1, wherein the flow segments are accommodated in the rotor device substantially independently of one another.

16. The flow device in accordance with claim 1, wherein the flow segments are movable relative to each other for the purposes of compensating for different thermal expansions in one or more spatial directions.

17. A method of operating a flow device, wherein the method comprises the following:
   passing a stream of raw gas that is to be cleaned through a plurality of flow segments of the flow device in a cleaning mode of the flow device wherein impurities from the stream of raw gas are at least one of separated and converted in flow bodies of the flow segments and a stream of clean gas is obtained downstream of the flow segments;

regenerating one or more flow segments by a regeneration device, wherein a temporary connection between one or more flow segments that are to be regenerated on the one hand and at least one of a heating device and a flushing device of the regeneration device on the other hand is established by a docking device of the regeneration device, wherein a direction of flow through the flow bodies in the cleaning mode is in a radial direction from an interior to an exterior.

18. The method in accordance with claim 17, wherein the one or more flow segments that are to be regenerated are decoupled at least one of functionally and fluidically from the rest of the flow segments by means the docking device and regenerated by the regeneration device whilst the rest of the flow segments continue to be used in the cleaning mode for removing impurities from the stream of raw gas.

19. The flow device in accordance with claim 1, wherein the flow device comprises a rotor device by which the flow segments are mounted such as to be rotatable relative to a housing of the flow device or relative to the docking device.

20. The flow device in accordance with claim 1, wherein the flow segments are mounted in the rotor device substantially independently of one another.

* * * * *